United States Patent

Yang et al.

[11] Patent Number: 5,825,420
[45] Date of Patent: Oct. 20, 1998

[54] PROCESSOR FOR PERFORMING TWO-DIMENSIONAL INVERSE DISCRETE COSINE TRANSFORM

[75] Inventors: Jar-Ferr Yang, Tainan; Bor-Long Bai, Taichung, both of Taiwan

[73] Assignee: National Science Council, Taipei, Taiwan

[21] Appl. No.: 540,273

[22] Filed: Oct. 6, 1995

Related U.S. Application Data

[63] Continuation-in-part of Ser. No. 239,186, May 6, 1994, abandoned.

[51] Int. Cl.$^6$ ............................................. H04N 7/30
[52] U.S. Cl. .................................. 348/403; 348/250
[58] Field of Search .......................... 348/384, 390, 348/400–403, 405, 409; 382/232, 248–250; 364/725; H04N 7/133

[56] References Cited

U.S. PATENT DOCUMENTS

| Re. 34,734 | 9/1994 | Cambonie | 364/725 |
|---|---|---|---|
| 5,063,608 | 11/1991 | Siegel | 348/405 |
| 5,257,213 | 10/1993 | Kim et al. | 364/725 |
| 5,299,025 | 3/1994 | Shirasawa | 364/725 |
| 5,319,724 | 6/1994 | Blonstein et al. | 382/248 |
| 5,345,408 | 9/1994 | Hoogenboom | 364/725 |
| 5,452,466 | 9/1995 | Fettweis | 364/725 |
| 5,515,388 | 5/1996 | Yagaski | 348/405 |
| 5,576,765 | 11/1996 | Cheney et al. | 348/409 |

OTHER PUBLICATIONS

M. A. Hague, "Two–Dimension Fast Cosine Transform", IEEE Trans. on Acoustica Speech, and Signal Processing, vol. ASSP. 33, No. 6, Dec. 1985, pp. 1532–1538.

U. Totzek, F. Matthiesen, "Two–dimesional Discrete Cosine Transformation with Linear Systolic Arrays", Systolic Array Processors, pp. 388–397, Prentice Hall, 1989.

*Primary Examiner*—Richard Lee
*Attorney, Agent, or Firm*—Tung & Associates

[57] ABSTRACT

A processor is provided for transforming N×N discrete cosine transform (DCT) coefficients $F_{uv}$ inputted from a run-length-code 5 (RLC) decoder and arranged in an input order into an image data $f_{jk}$ in an integrated circuit through a 2-D inverse discrete cosine transform (IDCT) procedure wherein subscripts u and v of DCT coefficients $F_{uv}$ are input frequency indices respectively having least significant bits (LSB) $u_0$ and $v_0$ having an exclusive-OR (XOR) and subscripts j and k of image data $f_{jk}$ are spatial indices generated by the integrated circuit, which comprises a cosine pre-multiplier array for computing cosine-weighted DCT coefficients, a principal subkernel mapper utilizing the cosine-weighted DCT coefficients by first referring to the indices u and v for forming a principal N/2×N/2 subkernel-weighted matrix $F_{uv}\underline{C}_1^{uv}$, an N×N accumulating matrix operating with the principal N/2×N/2 subkernel-weighted matrix $F_{uv}\underline{C}_1^{uv}$ for progressively accumulating the image data $f_{jk}$, and an output buffer for loading the image data $f_{jk}$ from the N×N accumulating matrix and transferring the image data $f_{jk}$. Such a processor will reduce the number of the multipliers involved and simplify the hardware complexity therefor, fasten the pixel rate thereof so that the present method is especially suitable for the future HDTV systems, be able to progressively transform the arbitrary input order of DCT coefficients thereof so that the present method is especially suitable for the HDTV recording player systems and has an excellent regularity thereof and applies a simple hardware architecture so that the cost for the hardware is relatively low and the method is suitable for the manufacturing of VLSI for the HDTV systems.

19 Claims, 9 Drawing Sheets if $N=2^m$,

| $M^{uv}_{+jk}$: | $A_{m+4}$ | $A_{m+3}$ | $A_{m+2}$ | $A_{m+1}$ | $A_m$ | $A_{m-1}$ | ... | $A_3$ | $A_2$ | $A_1$ | $A_0$ |
|---|---|---|---|---|---|---|---|---|---|---|---|
| | MSB | | | | | | | | | | LSB |

| $M^{uv}_{-jk}$: | $B_{m+4}$ | $B_{m+3}$ | $B_{m+2}$ | $B_{m+1}$ | $B_m$ | $B_{m-1}$ | ... | $B_3$ | $B_2$ | $B_1$ | $B_0$ |
|---|---|---|---|---|---|---|---|---|---|---|---|

| Cosine Index: | 16N | 8N | 4N | 2N | N | | | | | | |
| Equivalent Phase: | $8\pi$ | $4\pi$ | $2\pi$ | $\pi$ | $\pi/2$ | | | | | | |
| Usage: | Ignore | Ignore | Ignore | Sign determination | Within $\pi/2$ by summing all phases | | | Sum of those values is less than N | | | XOR of $u_0$ and $v_0$ |
| | | | | | | | | Address of $\frac{N}{2}$:1 Selector | | | Ignore |

Fig. 6A

| $A_{m+1}(B_{m+1})$ | $A_m(B_m)$ | Phase | Quadrant | Sign |
|---|---|---|---|---|
| 0 | 0 | 0~90° | 1st | + |
| 0 | 1 | 90~180° | 2nd | − |
| 1 | 0 | 180~270° | 3rd | − |
| 1 | 1 | 270~360° | 4th | + |

Truth table for determining the sign of cosine function

Fig. 6B

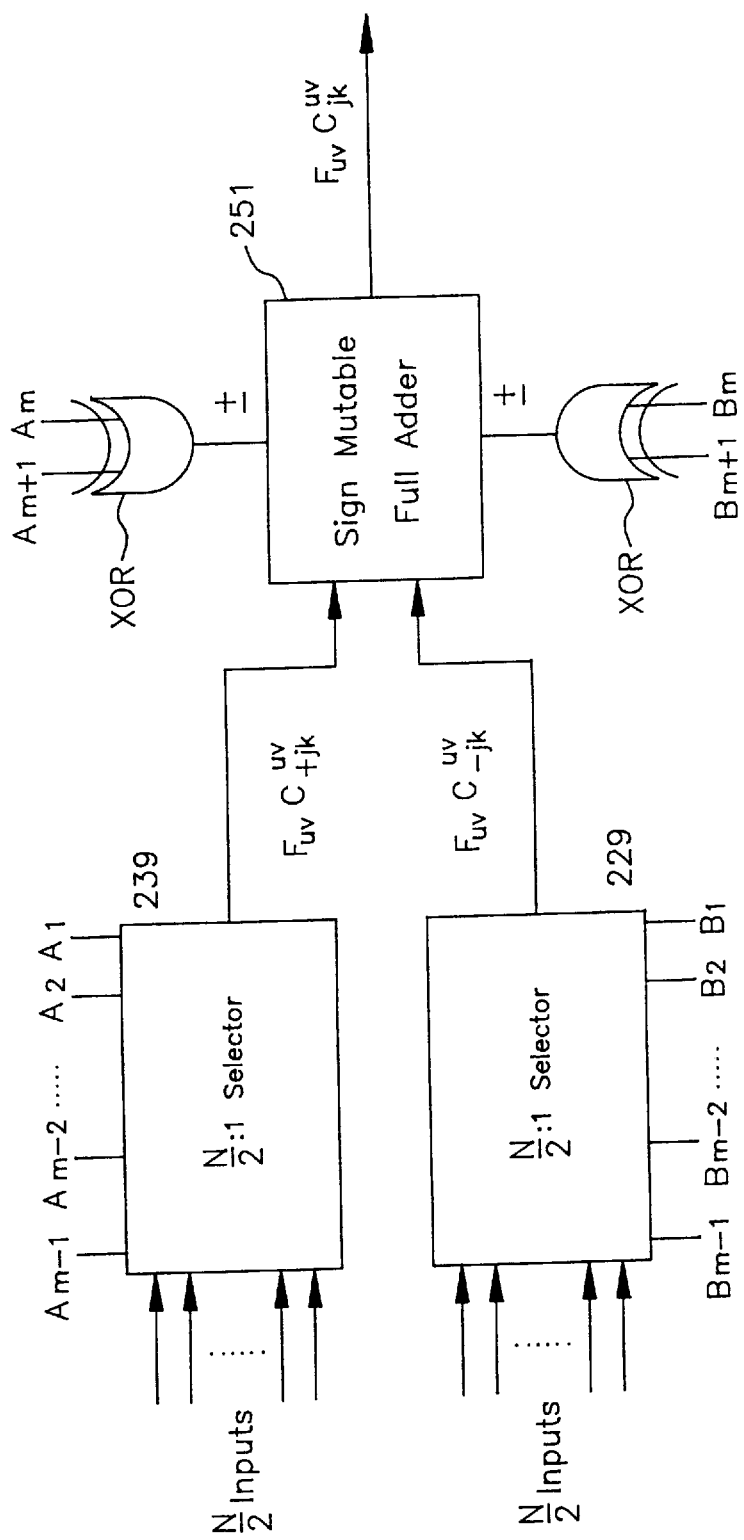
Fig. 6C  The detailed relation of the cell-based selector and adder

PROCESSOR FOR PERFORMING TWO-DIMENSIONAL INVERSE DISCRETE COSINE TRANSFORM

This is a continuation-in-part of application Ser. No. 08/239,186 filed on May 6, 1994, now abandoned.

FIELD OF THE INVENTION

The contents of which are incorporated herewith for reference.

BACKGROUND OF THE INVENTION

The invention relates generally to a processor for efficient calculation of the two-dimensional inverse discrete cosine transform (2-D IDCT) from the quantized discrete cosine transformed coefficients. The proposed processor, which requires the least number of multipliers, is more particularly useful for the decoder-only video systems, such as the future High Definition TeleVision (HDTV) receiver and HDTV cassette and disk players.

In the DCT-based video decoders, for example the HDTV receivers, the 2-D IDCT requires the largest computations among all functions. Therefore, how to develop a processor to transform the DCT coefficients into the image data is an important issue for video related applications. For a given 2-D image data $\{f_{jk}, j \text{ and } k=0, 1, 2, \ldots, (N-1)\}$ and 2-D DCT coefficients $\{F_{uv}, u \text{ and } v=0, 1, 2, \ldots, (N-1)\}$, the widely known 2-D DCT and IDCT formulations are expressed by $$F_{uv} = \frac{2C_u C_v}{N} \sum_{j=0}^{N-1} \sum_{k=0}^{N-1} f_{jk} \cos\left[\frac{(2j+1)u\pi}{2N}\right] \cos\left[\frac{(2k+1)v\pi}{2N}\right], \quad (1)$$

$$f_{jk} = \frac{2}{N} \sum_{u=0}^{N-1} \sum_{v=0}^{N-1} C_u C_v F_{uv} \cos\left[\frac{(2j+1)u\pi}{2N}\right] \cos\left[\frac{(2k+1)v\pi}{2N}\right], \quad (2)$$

respectively, where $C_w = 1/\sqrt{2}$ for $w=0$; $C_w = 1$ for $w \neq 0$. The computations for dividing and multiplying by the power of 2 can be neglected since they just need only bit-shifting processing. When $C_u$, $C_v$, and $2/N$ are ignored, the computation of Eq.(2) requires $2N^4$ multiplications and $(N^4-N^2)$ additions.

Most conventional methods for computing the 2-D IDCT are directed to the row-column decomposition which requires 2N processes of the 1-D IDCT to accomplish an N×N IDCT computation. When the row-column approach is used, more multipliers in pipeline or systolic structure are needed for real-time applications. In general, the complexity of a multiplier is about 20 times of that of an adder. There are some fast 2-D DCT and 2-D IDCT algorithms for realizing the IDCT chips, for example, the Haque method requires irregular computations and many multipliers to be realized in VLSI chips.

To sum up, these conventional methods shown in FIG. 1 generally have the following disadvantages, namely:

1) Because these conventional methods use many more multipliers, the chips manufactured thereby takes much space for the purpose of fast computation;
2) In these conventional methods, the computation speeds are relatively slower, so their processing speeds are not enough for the HDTV receivers and recording systems;
3) These conventional methods utilize many more multipliers to achieve the relatively fast computation speed. So, the relatively complex circuit designs and a profound technology to manufacture the relatively complex VLSI are also must. This causes a relatively high cost; and
4) These conventional methods require an N×N input buffer to achieve the block processing scheme. So, the relatively large VLSI and latence delay are also must. This causes a relatively high cost.

Since the fast 2-D IDCT processor is the key component for video applications, an easy realization of the 2-D IDCT will bring HDTV related products a feasible price for prospective users. It is therefore attempted by the Applicants to deal with the above situation encountered by the prior art.

SUMMARY OF THE INVENTION

An objective of the present invention is to provide a processor for computation of the 2-D IDCT, which will reduce the number of the multipliers involved and simplify the hardware complexity therefor.

Another objective of the present invention is to provide a processor for computation of the 2-D IDCT, which will fasten the pixel rate thereof so that the present method is especially suitable for the future HDTV systems.

The other objective of the present invention is to provide a processor for computation of the 2-D IDCT in the coefficient-by-coefficient scheme, which will be able to progressively transform the arbitrary input order of DCT coefficients thereof so that the present method is especially suitable for the HDTV recording player systems.

A further objective of the present invention is to provide a method for computation of the 2-D IDCT, which has an excellent regularity thereof and applies a simple hardware architecture so that the cost for the hardware is relatively low and the method is suitable for the manufacturing of VLSI for the HDTV systems.

In accordance with the present invention, a processor for transforming N×N discrete cosine transform (DCT) coefficients $F_{uv}$ inputted from a run-length-code (RLC) decoder into an image data $f_{jk}$ in an integrated circuit by means of a 2-D inverse discrete cosine transform (IDCT) procedure wherein subscripts u and v of said DCT coefficients $F_{uv}$ are input frequency indices and subscripts j and k of said image data $f_{jk}$ are spatial indices generated by said integrated circuit, which comprises a cosine pre-multiplier array for computing cosine-weighted DCT coefficients, a principal subkernel mapper utilizing the cosine-weighted DCT coefficients by first referring to the indices u and v for forming a principal N/2×N/2 subkernel-weighted matrix $F_{uv}\underline{C}_1^{uv}$, an N×N accumulating matrix operating with the principal N/2×N/2 subkernel-weighted matrix $F_{uv}\underline{C}_1^{uv}$ for progressively accumulating the image data $f_{jk}$, and an output buffer for loading the image data $f_{jk}$ from the N×N accumulating matrix and transferring the image data $f_{jk}$.

In accordance with a first aspect of the present invention, the N is a mth power of 2, $2^m$, and m is a positive integer.

In accordance with a second aspect of the present invention, according to the E/O generated by the exclusive OR (XOR) of $u_0$ and $v_0$ respectively being the LSBs of u and v, the cosine pre-multiplier array computes the cosine-weighted DCT coefficients.

In accordance with a third aspect of the present invention, the cosine pre-multiplier array further includes a fixed-coefficient multiplier and a plurality of dual-fixed-coefficient multipliers.

In accordance with a fourth aspect of the present invention, the cosine pre-multiplier array further includes a 2:1 selector operating with the fixed-coefficient multiplier having a fixed coefficient $\cos\pi/2N$ for obtaining the cosine-weighted DCT coefficient $F_{uv}$ when the E/O is LOW and the cosine-weighted DCT coefficient $F_{uv}\cos\pi 2/N$ when the E/O is HIGH.

In accordance with a fifth aspect of the present invention, the cosine pre-multiplier array further includes an adder operating with each of the plurality of dual-fixed-coefficient multipliers having dual-fixed coefficients $$\alpha = \cos\frac{2(k-1)\pi}{2N} \text{ and } \beta = \cos\frac{(2k-1)\pi}{2N}$$

wherein k=2, 3, . . . N/2 for obtaining the cosine-weighted DCT coefficients $$F_{uv}\cos\frac{2(k-1)\pi}{2N}$$

when the E/O is LOW and the cosine-weighted DCT coefficients $$F_{uv}\cos\frac{(2k-1)\pi}{2N}$$

when the E/O is HIGH.

In accordance with a sixth aspect of the present invention, the dual-fixed-coefficient multipliers are realized respectively according to following three cases:

Case I: if $\alpha_q$ and $\beta_q$ are both LOW, the qth bits of $\alpha$ and $\beta$ can be neglected.

Case P: if $\alpha_j$ and $\beta_j$ are both HIGH, a jth bit left shifting of the DCT coefficient by using an adder is added together to become the cosine-weighted DCT coefficient.

Case C: if $\alpha_i$ and $\beta_i$ different, an ith bit shifting of the DCT coefficient by using an adder is added together to become the cosine-weighted DCT coefficient when a controlling logic $\gamma_i = (E/O \cap \alpha_i) \cap (E/O \cap \beta_i)$ is HIGH; wherein said q, j and i are integers denoting the indices of bit positions of the coefficients.

In accordance with a seventh aspect of the present invention, the adders of each of the dual-fixed multipliers are functioned in a parallel architecture.

In accordance with an eighth aspect of the present invention, each multiplier is a read-only-memory (ROM) which stores therein cosine-weighted DCT coefficients being in use and corresponding to respective the inputted DCT coefficient and the E/O value as an address accompanied therewith.

In accordance with a ninth aspect of the present invention, the principal subkernel mapper further comprises an addition subkernel address generator, a subtraction subkernel address generator, two N/2:1 selector matrices and a sign mutable addition matrix for parallel computing the principal N/2×N/2 subkernel-weighted matrix $F_{uv}\underline{C}_1{}^{uv}$.

In accordance with a tenth aspect of the present invention, the addition subkernel address generator further comprises a first set of N/2×N/2 adders for computing cosine indices $M_{+jk}{}^{uv}$, a first set of N/2×N/2 index registers utilizing (m+2) bits for storing therein the said cosine indices so as to select one corresponding the cosine-weighted DCT coefficient and determine a sign change thereof in order to compute the principal N/2×N/2 subkernel-weighted matrix $F_{uv}\underline{C}_1{}^{uv}$, and a first pair of 2:1 selectors having an m-input OR gate and an adder for computing the initial cosine index $M_{+00}{}^{uv}$ by adding u and v.

In accordance with an eleventh aspect of the present invention, the subtraction subkernel address generator further comprises a second set of N/2×N/2 adders for computing cosine indices $M_{-jk}{}^{uv}$, a second set of N/2×N/2 index registers utilizing (m+2) bits for storing therein said cosine indices so as to select one corresponding the cosine-weighted DCT coefficient and determine a sign change thereof in order to compute the principal N/2×N/2 subkernel-weighted matrix $F_{uv}\underline{C}_1{}^{uv}$, and a second pair of 2:1 selectors having an m-input OR gate and an adder for computing the initial cosine index $M_{-00}{}^{uv}$ by adding u and 4N-v.

In accordance with a twelfth aspect of the present invention, the cosine index $M_{+jk}{}^{uv}$ or $M_{-jk}{}^{uv}$ is the selection address for which a value of one of the cosine-weighted DCT coefficients is selected.

In accordance with a thirteenth aspect of the present invention, the m-input OR gate is used to detect whether the indices u and v are zero or not so that said 2:1 selector will replace said u and v in the addition subkernel address generator by N/2 and replace said u and 4N-v in the subtraction subkernel address generator by N/2 when the u and v are zero, respectively.

In accordance with a fourteenth aspect of the present invention, said (m+2) bits of cosine index $M_{+jk}{}^{uv}$ or $M_{-jk}{}^{uv}$ in first or second set of N/2×N/2 index registers include 1st to mth bits with a corresponding N/2:1 selector for addressing each of the cosine-weighted DCT coefficients, (m+2)th and (m+1)th bits for determining a sign of the selected cosine-weighted DCT coefficient, and a zeroth bit which is ignored.

In accordance with a fifteenth aspect of the present invention, the sign change of the cosine-weighted DCT coefficients is controlled by the XOR of the (m+1)th and the mth bits in the first and second sets of N/2×N/2 index registers.

In accordance with a sixteenth aspect of the present invention, the accumulating matrix accumulates the principal N/2×N/2 subkernel-weighted matrix $F_{uv}\underline{C}_1{}^{uv}$, computes the image data $f_{jk}$ and outputs the image data $f_{jk}$ to the N/2×N/2 output buffer, which further includes a first N/2×N/2 accumulating submatrix directly adds the principal N/2×N/2 subkernel-weighted matrix $F_{uv}\underline{C}_1{}^{uv}$, a second N/2×N/2 accumulating submatrix adds the principal N/2×N/2 subkernel-weighted matrix $F_{uv}\underline{C}_1{}^{uv}$ in an order of reversed columns when the LSB $u_0$ is LOW and subtracts same when the LSB $u_0$ is HIGH, a third N/2×N/2 accumulating submatrix adds the principal N/2×N/2 subkernel-weighted matrix $F_{uv}\underline{C}_1{}^{uv}$ in an order of reversed rows when the LSB $v_0$ is LOW and subtracts same when the LSB $v_0$ is HIGH, and a fourth N/2×N/2 accumulating submatrix adds the principal N/2×N/2 subkernel-weighted matrix $F_{uv}\underline{C}_1{}^{uv}$ in an order of reversed rows and reversed columns when said XOR of said LSBs $u_0$ and $v_0$ is LOW and subtracts same when the XOR of said LSBs $u_0$ and $v_0$ is HIGH.

In accordance with a seventeenth aspect of the present invention, the N×N DCT coefficients $F_{uv}$ will be skipped if zero.

In accordance with an eighteenth aspect of the present invention, a very large scale integration (VLSI) circuit can be constructed according to the present processor.

The present invention may best be understood through the following descriptions with reference to the accompanying drawings, in which:

BRIEF DESCRIPTION OF THE DRAWINGS

FIGS. 6A, 6B and 6C schematically showing the binary representation of cosine indices $M_{+jk}^{uv}$ and $M_{-jk}^{uv}$ and the corresponding selectors and adders according to the present invention.

DETAILED DESCRIPTION OF THE PREFERRED EMBODIMENT

Figure 1:
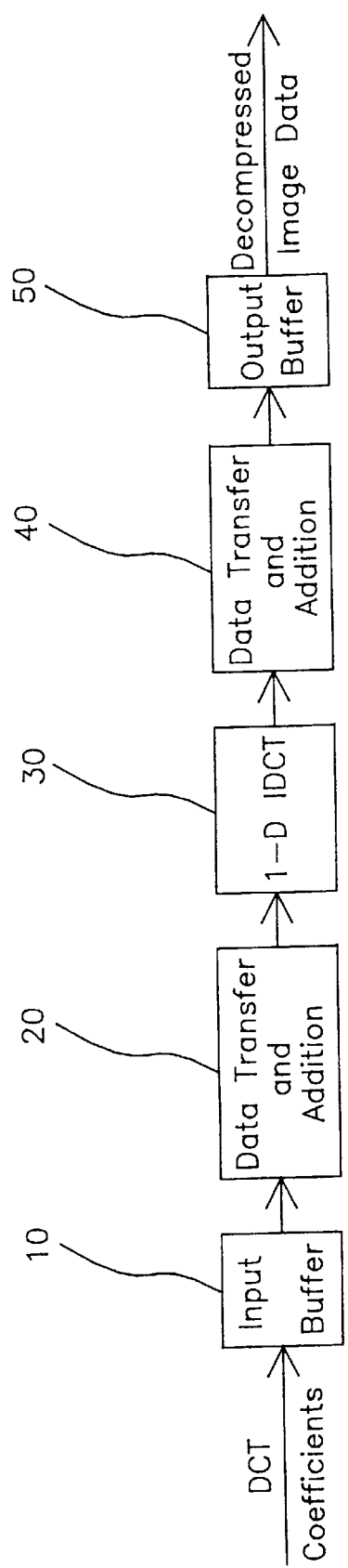
FIG. 1 is a schematic view showing a prior configuration of the row/column decomposition 1-D IDCT processor.
Figure 2:
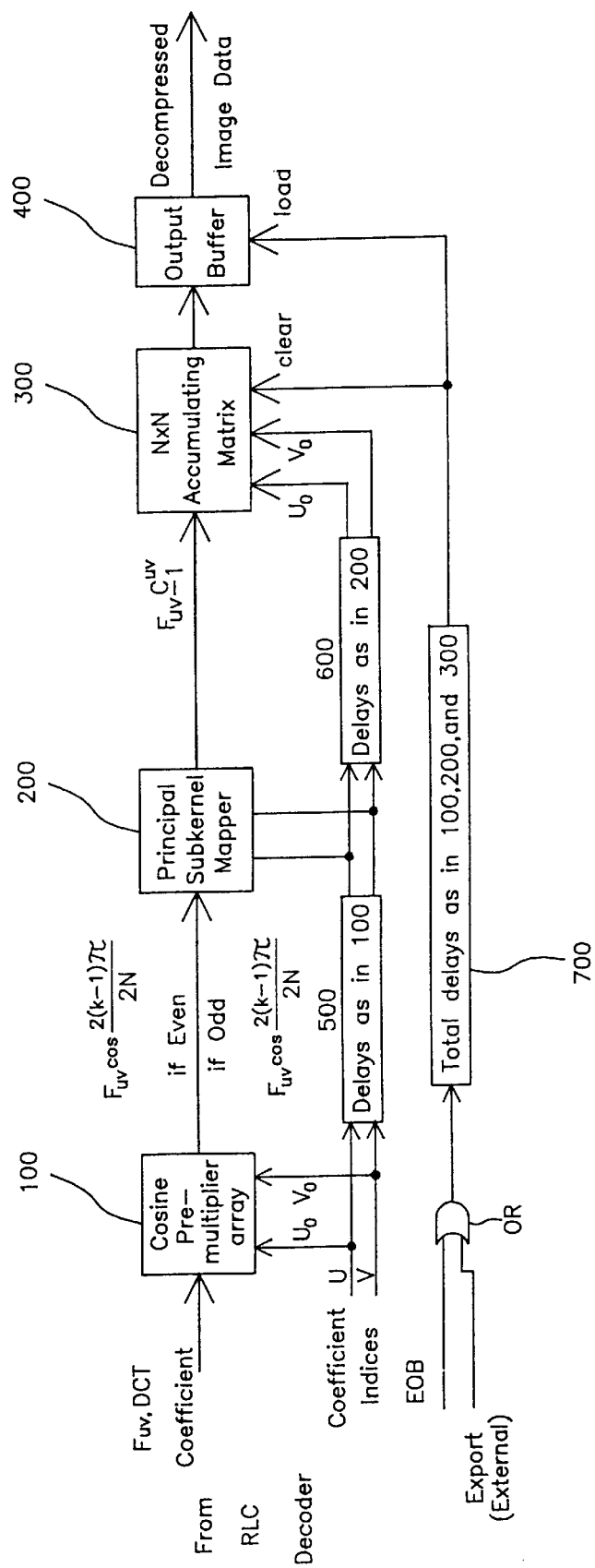
FIG. 2 schematically showing an architecture in terms of a functional diagram of a 2-D IDCT processor according to the present invention.

Referring to FIG. 2, without requiring any input buffer, the present processor directly inputs the decoding result of the run-length-code (RLC) decoder. The RLC decoder provides the processor with either the DCT coefficient $F_{uv}$ and its corresponding indices u and v for the transformation or the end-of-block (EOB) logic to cease the transformation. And controlled by the least significant bits (LSB) $u_0$ and $v_0$ of the respective indices u and v, the cosine pre-multiplier array 100 generates the cosine-weighted DCT coefficients, $$\left\{ F_{uv}, F_{uv}\cos\frac{2\pi}{2N}, F_{uv}\cos\frac{4\pi}{2N}, \ldots, F_{uv}\cos\frac{(N-2)\pi}{2N} \right\}$$

or $$\left\{ F_{uv}\cos\frac{\pi}{2N}, F_{uv}\cos\frac{3\pi}{2N}, \ldots, F_{uv}\cos\frac{(N-1)\pi}{2N} \right\}.$$

The principal subkernel mapper 200 refers to the DCT coefficient indices u and v and utilizes the cosine-weighted DCT coefficients to form the principal N/2×N/2 subkernel-weighted matrix $F_{uv}\underline{C}_1^{uv}$. According to the $u_0$ and $v_0$, the N×N accumulating matrix 300 accumulates the principal N/2×N/2 subkernel-weighted matrix $F_{uv}\underline{C}_1^{uv}$ to progressively obtain the image data $f_{jk}$. And when the EOB or the Export is HIGH, the output buffer 400 loads the results of the accumulating matrix 300 for exporting the transformed image data $f_{jk}$. At the same time, the accumulating matrix 300 is cleared for restarting a new transformation. All the functions from the cosine pre-multiplier array 100 to the accumulating matrix 300 are perfectly synchronized with the DCT coefficient indices u and v. For increasing the through-rate, the cosine pre-multiplier array 100, the principal subkernel mapper 200 and the accumulating matrix 300 can be further constructed into pipeline stages. Thus, the proper delays 500 and 600 should be added for the synchronization of the present 2-D IDCT processor. Similarly, the proper delay 700 for the output control should also added for correctly obtaining the complete desired image data $f_{jk}$.

Figure 3:
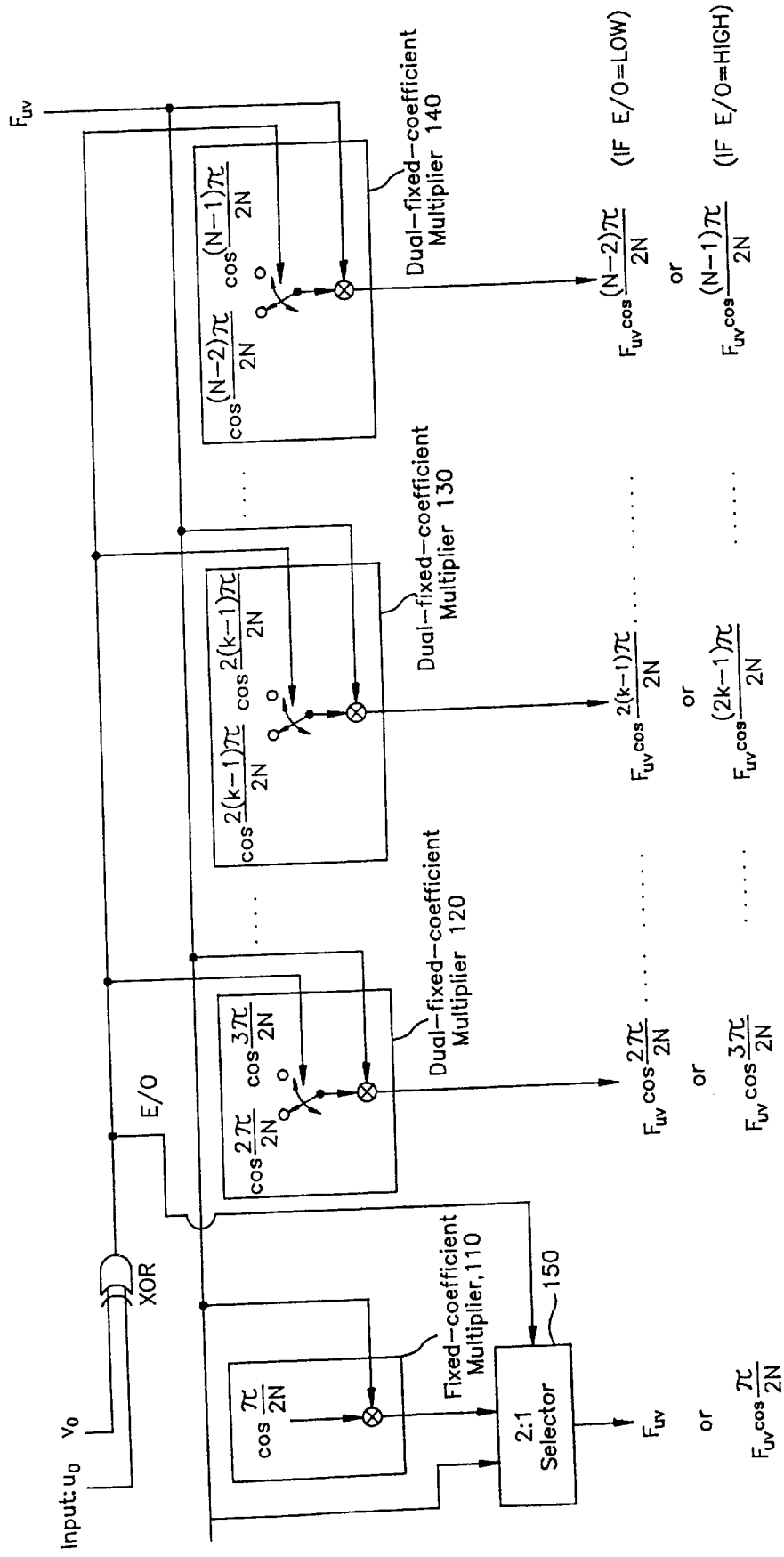
FIG. 3 schematically showing an architecture in terms of a functional diagram of a cosine pre-multiplier array according to the present invention.

Referring to FIG. 3, the cosine pre-multiplier array in the present invention is shown in which the N/2 multipliers perform the multiplication of the input DCT coefficient and one of cosine functions. The first multiplier 110 computes $F_{uv}$ or $F_{uv}\cos\pi/2N$; the second multiplier 120 performs $F_{uv}\cos 2\pi/2N$ or $F_{uv}\cos 3\pi/2N$, . . . , the kth multiplier 130 calculates $$F_{uv}\cos\frac{2(k-1)\pi}{2N} \text{ or } F_{uv}\cos\frac{(2k-1)\pi}{2N},$$

. . . , and the last multiplier 140 accomplishes $$F_{uv}\cos\frac{(N-2)\pi}{2N} \text{ or } F_{uv}\cos\frac{(N-1)\pi}{2N}.$$

Hereafter, we use the cosine index M for simply referring to value of the cosine-weighted DCT coefficient $F_{uv}\cos M\pi/2N$. When the E/O logic, the XOR of $u_0$ and $v_0$ is LOW (HIGH), the coefficients with the even (odd) cosine indices in the multipliers are selected. Usually, the realization of a multiplier with fixed coefficient is much easier than that for a general multiplier. Corresponding to the positions of non-zero bits, the fixed-coefficient multiplier can be achieved by adding the proper shifting results of the input. In FIG. 3, the first multiplier 110 is realized by a multiplier with fixed coefficient of $\cos\pi/2N$ and the 2:1 selector 150 controlled by the E/O logic. The remaining multipliers are realized in the dual-fixed-coefficient multipliers 120~140. Since two coefficients for the kth dual-fixed-coefficient multiplier in the present invention are $\alpha = \cos 2(k-1)\pi/2N$ and $\beta = \cos(2k-1)\pi/2N$ for k=2, 3, . . . , N/2. The realization of the dual-coefficient multiplier 120~140 is depicted as follows:

i) dual fixed coefficients:

$$\alpha = \cos\frac{2(k-1)\pi}{2N} = \alpha_{14}\ldots\alpha_q\ldots\alpha_j\ldots\alpha_i\ldots\alpha_3\alpha_2\alpha_1\alpha_0$$

$$\beta = \cos\frac{2(k-1)\pi}{2N} = \beta_{14}\ldots\beta_q\ldots\beta_j\ldots\beta_i\ldots\beta_3\beta_2\beta_1\beta_0$$

wherein if the E/O is LOW, the dual-fixed coefficient will be $\alpha$; while if the E/O is HIGH, the dual-fixed coefficient will be $\beta$.

ii) realizing rules:

Case I: if $\alpha_q$ and $\beta_q$ are both LOW, the qth bits of $\alpha$ and $\beta$ can be neglected.

Case P: if $\alpha_j$ and $\beta_j$ are both HIGH, a jth bit left shifting of the DCT coefficient using an adder is added together to become the cosine-weighted DCT coefficient.

Case C: if $\alpha_i$ and $\beta_i$ are different, an ith bit shifting of the DCT coefficient using an adder is added together to become the cosine-weighted DCT coefficients when a controlling logic $\gamma_i = (\text{E/O} \cap \alpha_i) \cap (\text{E/O} \cap \beta_i)$ is HIGH.

iii) taking N=32, k=13:

$\alpha$ =  MSB                                                                    LSB

| 0 | 0 | 1 | 1 | 0 | 1 | 1 | 0 | 1 | 0 | 1 | 1 | 1 | 0 | 1 |
|---|---|---|---|---|---|---|---|---|---|---|---|---|---|---|

β = MSB -continued LSB

| 0 | 0 | 1 | 1 | 0 | 0 | 0 | 0 | 1 | 1 | 1 | 1 | 1 | 0 | 1 |
|---|---|---|---|---|---|---|---|---|---|---|---|---|---|---|

CASE:  I  I  P  P  I  C  C  I  P  C  P  P  P  I  P wherein
output of dual-fixed-fixed coefficient multiplier is equal to:

($F_{uv}$+2-bit-shift $F_{uv}$)+(3-bit-shift $F_{uv}$+4-bit-shift $F_{uv}$)++(6-bit-shift $F_{uv}$+11-bit-shift $F_{uv}$)++(12-bit-shift $F_{uv}$+conditional addition);

where the conditional addition is equal to:

Not (E/O)(5-bit-shift $F_{uv}$+9-bit-shift $F_{uv}$)+E/O(10-bit-shift $F_{uv}$).

Since the two consecutive cosine functions α and β are close, their corresponding bits will be almost equal especially for large N. The complexity of the dual-fixed-coefficient multipliers can be greatly reduced to near that of the fixed-coefficient one. For example, N=32 and k=13, only eight full adders are required to compute a 15-bit resolution multiplier.

Figure 4:
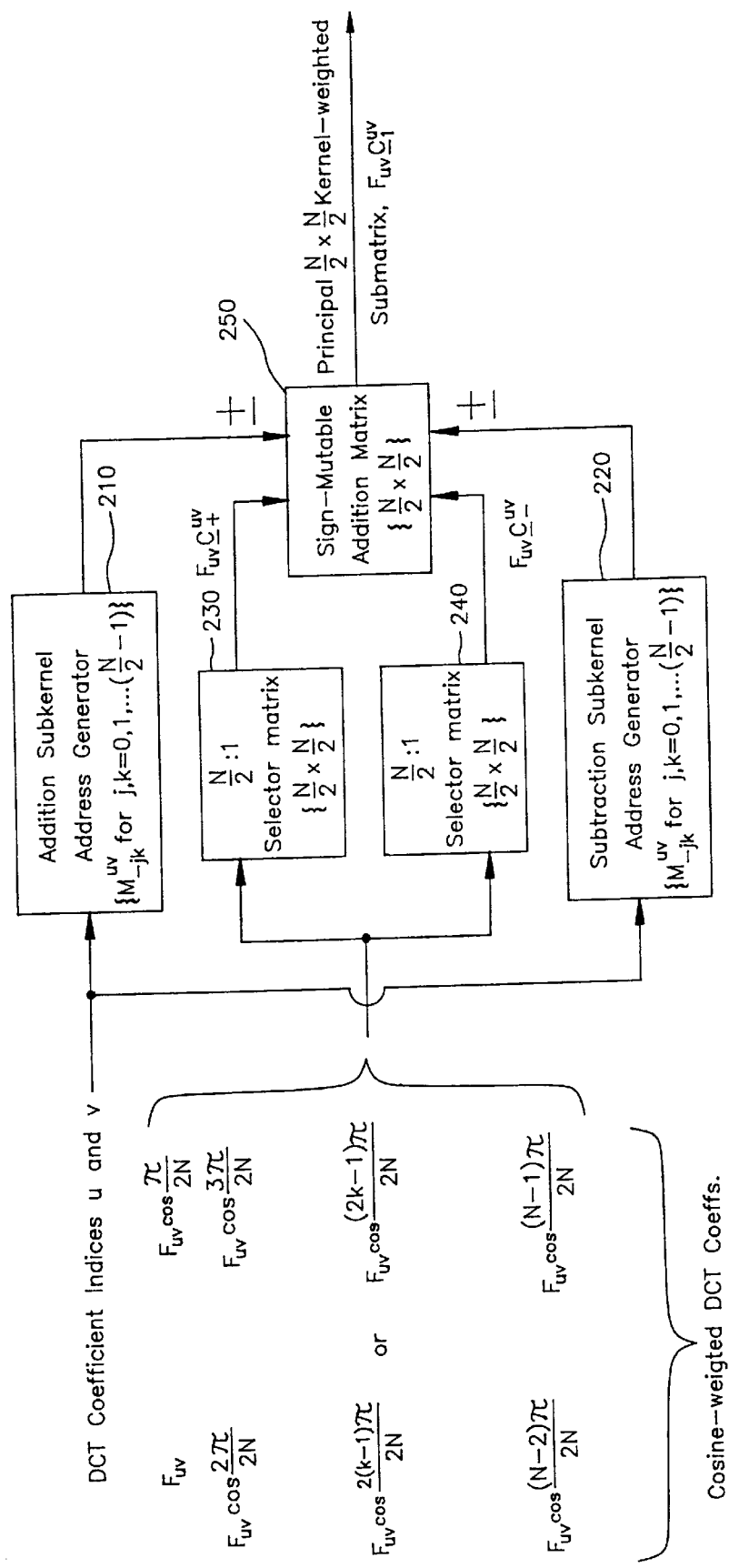
FIG. 4 schematically showing an architecture in terms of a functional diagram of a principal N/2×N/2 subkernel mapper according to the present invention.
Figure 5:
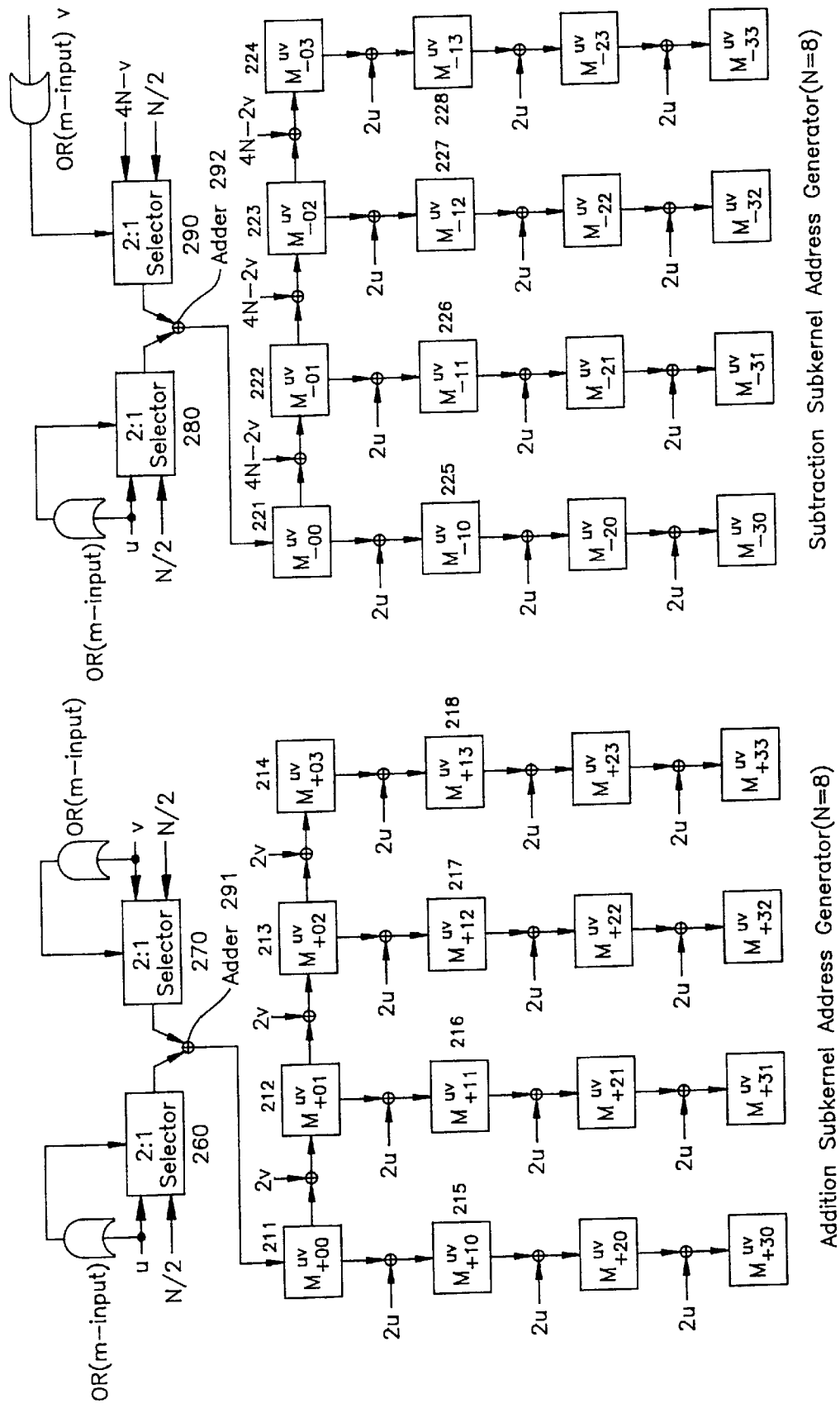
FIG. 5 schematically showing an implementation of the addition and subtraction subkernel address generators according to the present invention.

FIG. 4 shows the principal subkernel mapper which is composed of an addition subkernel address generator 210, a subtraction subkernel address generator 220, two N/2:1 selector matrices 230 and 240 and a sign mutable addition matrix 250 to parallelly compute the principal N/2×N/2 subkernel-weighted matrix $F_{uv}\underline{C}_1^{uv}$. If N=8, FIG. 5 illustrates the detailed implementation of addition and subtraction subkernel address generators. The cosine indices $M_{+jk}^{uv}$ and $M_{-jk}^{uv}$ for j, k=0, 1, . . . , (N/2−1) are employed to refer to the cosine-weighted DCT coefficients. Also in FIG. 5, the m-input OR gates are used to detect whether u and v are zero or not. If u (or v) is zero, the value of N/2 is replaced by the 2:1 selectors 260~290 for computing the first cosine indices $M_{+00}^{uv}$ and $M_{-00}^{uv}$. From the first addition cosine index $M_{+00}^{uv}$ stored in the register 211 which is obtained by the adder 291, if the column index (k) is increased by one, the positive cosine index is increased by 2 v to store in the successive registers 212~214. If the row index (j) is increased by one, the positive cosine is increased by 2 u to store registers 215~218 and their successive registers. Similarly, we can replace v for 4N-v and 2 v for 4N−2 v in the addition subkernel address generator to obtain the subtraction subkernel address generator stored in the registers 221~228 and their successive registers. In other words, the addition subkernel address generator can be performed by the column index (k) increased by π implying the adder added 2πv and the row index (j) increased by π implying the adder added 2πu for successive registers, while the subtraction subkernel address generator can be performed by the column index (k) increased by π implying the adder added (4πN−2πv) and the row index (j) increased by π implying the adder added 2πu for successive registers. With these two cosine address generators at hand, we can refer to FIGS. 6A, 6B and 6C to see the detailed cell-based realization of the principal subkernel mapper in the present invention. If the cosine index is increased or decreased by the multiple of 4N, the value of the cosine function actually is not changed. Since the pre-multiplied N/2 cosine functions are in the first quadrant (0~π/2), we only require the wordlength of (m+2) bits for all indices. The LSBs of the addressers of $M_{+jk}^{uv}$ and $M_{-jk}^{uv}$ are equal to the XOR of $u_0$ and $v_0$, which are used in the cosine pre-multiplier array and can be ignored. The XOR of two most significant bits (MSBs), the (m+1)th and mth bits are used to control the sign of the subkernel adder 251 and the remaining (m−1) bits exactly equal to the addresses of the N/2:1 selectors 229 and 239 in FIG. 6C.

Figure 7:
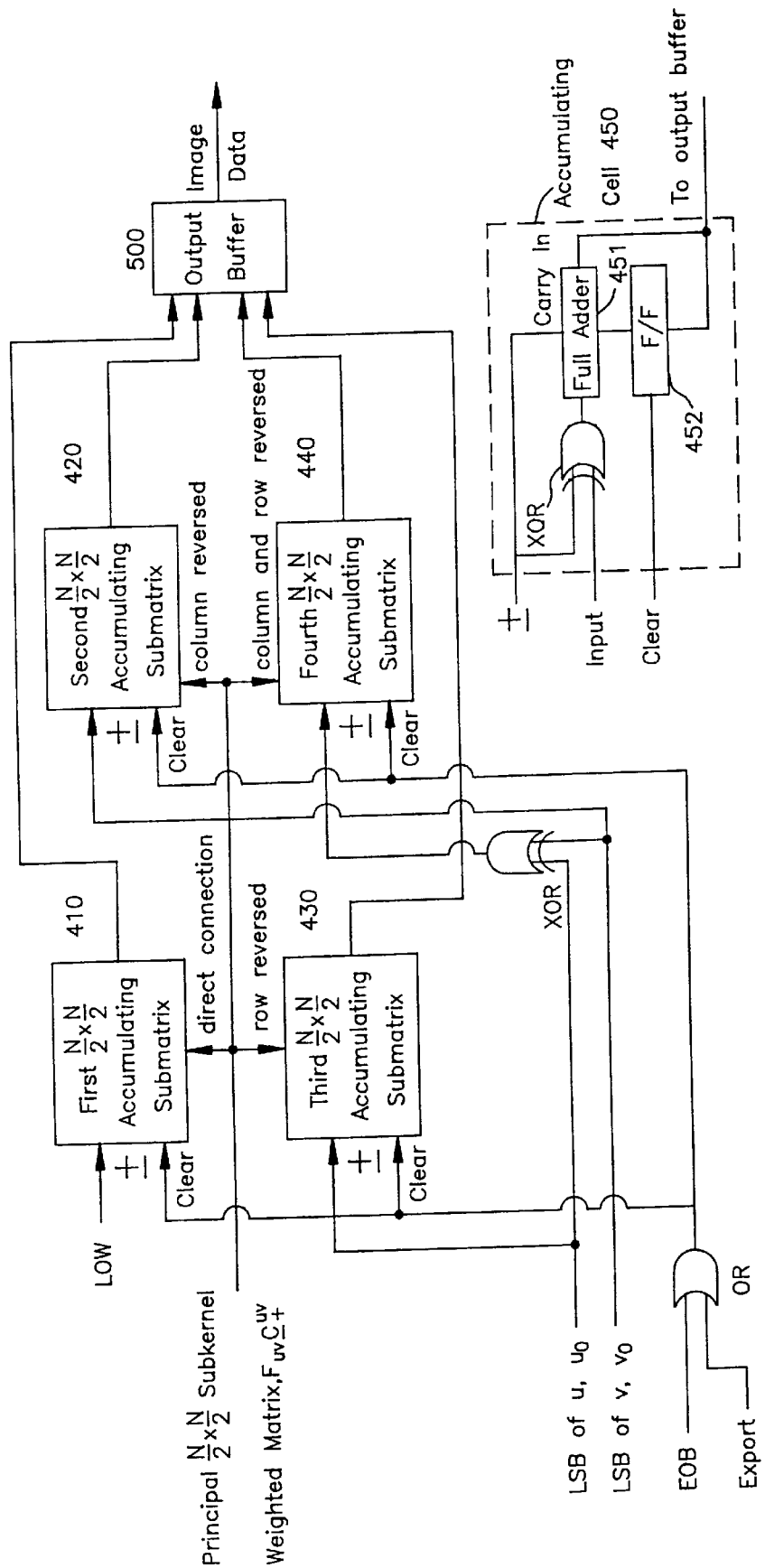
FIG. 7 schematically showing an architecture in terms of a functional diagram of an N×N accumulating matrix according to the present invention.

Referring to FIG. 7, the accumulating matrix 300 as defined in FIG. 2 progressively accumulates the principal N/2×N/2 subkernel-weighted matrix $F_{uv}\underline{C}_1^{uv}$ to obtain the image data $f_{jk}$. The accumulating matrix, which is divided into four N/2×N/2 submatrices 410~440, is composed of N×N accumulating cells 450. The accumulating matrix outputs the results to the output buffer 500 (shown in FIG. 2) when the EOB or the Export is HIGH. After the output, the contents of the accumulating submatrix are cleared to zeros and ready for a new 2-D IDCT transformation at the same instant. The first accumulating submatrix 410 directly adds the principal N/2×N/2 subkernel-weighted matrix $F_{uv}\underline{C}_1^{uv}$. The second accumulating submatrix 420 adds the principal N/2×N/2 subkernel-weighted matrix $F_{uv}\underline{C}_1^{uv}$ in the order of reversed columns when the $u_0$ is LOW and subtracts the same when the $u_0$ is HIGH. The third accumulating submatrix 430 adds the principal N/2×N/2 subkernel-weighted matrix $F_{uv}\underline{C}_1^{uv}$ in the order of reversed rows when the $v_0$ is LOW and subtracts the same when the $v_0$ is HIGH. The fourth accumulating submatrix 440 adds the principal N/2×N/2 subkernel-weighted matrix $F_{uv}\underline{C}_1^{uv}$ in the order of reversed columns and reversed rows when the XOR of the $u_0$ and $v_0$ is LOW and subtracts the same when the XOR of the $u_0$ and $v_0$ is HIGH. The reversed orders can be performed by direct hardware connections for parallel implementation. Further, for 2s complement data, the basic accumulating cell 450 is realized by a full adder 451, a register 452 and XOR gates.

Now, we shall describe the principle of the present invention in detail for verifying the above realization of the circuits. For progressive implementation of 2-D IDCT, we can directly compute the image data contributed by $F_{uv}$ as $$f_{jk}^{uv} = \frac{2}{N} C_u C_v F_{uv} \cos\left(\frac{(2j+1)u\pi}{2N}\right) \cos\left(\frac{(2k+1)v\pi}{2N}\right). \quad (3)$$

Then, the complete solution of the 2-D IDCT in Eq.(2) can be expressed by summing up all the one-coefficient-only results in Eq.(3) as $$f_{jk} = \sum_{u=0}^{N-1} \sum_{v=0}^{N-1} f_{jk}^{uv}. \quad (4)$$

The computational kernel in Eq.(3) of the (j,k)th pixel for the DCT coefficient $F_{uv}$ is $$C_{jk}^{uv} = \frac{2}{N} C_u C_v \cos\left(\frac{(2j+1)u\pi}{2N}\right) \cos\left(\frac{(2k+1)v\pi}{2N}\right). \quad (5)$$

For simple explanation, the above equations can be rewritten into matrix forms. From Eq.(5), the IDCT computational kernel matrix for $F_{uv}$ is then expressed by $$\underline{C}^{uv} = \begin{pmatrix} C_{00}^{uv} & C_{01}^{uv} & \cdots & C_{0(N-1)}^{uv} \\ C_{10}^{uv} & C_{11}^{uv} & \cdots & C_{1(N-1)}^{uv} \\ & & \cdots & \\ C_{(N-1)0}^{uv} & C_{(N-1)1}^{uv} & \cdots & C_{(N-1)(N-1)}^{uv} \end{pmatrix} \quad (6)$$

After the 2-D IDCT of $F_{uv}$ in Eq.(3), the reconstructed subimage in the matrix form becomes $$\underline{f}^{uv} = F_{uv}\underline{C}^{uv}. \quad (7)$$

From Eqs.(4) and (7), the whole reconstructed matrix can be finally expressed by $$\underline{f} = \sum_{u=0}^{N-1}\sum_{v=0}^{N-1}\underline{f}^{uv} = \sum_{u=0}^{N-1}\sum_{v=0}^{N-1}F_{uv}\underline{C}^{uv}. \quad (8)$$

For any kernel matrix, without using any regularity, it requires $N^2$ multiplications in Eq.(7) for each DCT coefficient $F_{uv}$. Totally, it takes $2N^4$ multiplications and $(N^4-N^2)$ additions to complete a 2-D IDCT computation in Eq.(8). If we can find the symmetrical properties of the kernel matrices subsequently, the further reduction of computational complexity in Eq.(7) can be achieved. For example, the (0,0)th kernel matrix, $\underline{C}^{00}$, by direct inspection, consists of only one element, $C_{jk}^{00}=1/N$, for all j and k. The computation of "$1/NF_{00}$" requires a bit-shifting, which actually requires no multiplication. The kernel matrix $\underline{C}^{00}$ is symmetrical matrix in any directions. Thus, the general symmetrical properties of kernel matrices will be the key issue for development of the processor.

To discover the symmetrical properties, we employ some simple identities of the cosine function, namely (1) $\cos(-\theta)=\cos(\theta)$; (9a)

(2) $\cos(n\pi+\theta)=(-1)^n\cos(\theta)$; (9b)

(3) $\cos\theta_1\cos\theta_2 = 1/2[\cos(\theta_1+\theta_2)+\cos(\theta_1-\theta_2)]$. (9c)

The kernel matrix for each DCT coefficients $F_{uv}$ is firstly divided into four submatrices as $$\underline{C}^{uv} = \begin{pmatrix} \underline{C}_1^{uv} & \underline{C}_2^{uv} \\ \underline{C}_3^{uv} & \underline{C}_4^{uv} \end{pmatrix}, \quad (10)$$

where the first subkernel matrix, if $N=8$, is given by $$\underline{C}_1^{uv} = \begin{pmatrix} C_{00}^{uv} & C_{01}^{uv} & C_{02}^{uv} & C_{03}^{uv} \\ C_{10}^{uv} & C_{11}^{uv} & C_{12}^{uv} & C_{13}^{uv} \\ C_{20}^{uv} & C_{21}^{uv} & C_{22}^{uv} & C_{23}^{uv} \\ C_{30}^{uv} & C_{31}^{uv} & C_{32}^{uv} & C_{33}^{uv} \end{pmatrix}. \quad (11)$$

The remaining three subkernel matrices can be further expressed in terms of the elements in $\underline{C}_1^{uv}$. Let $K=N-1-k$, the (j,K)th element of the kernel matrix in Eq.(5) can be expressed as $$C_{jK}^{uv} = \frac{2}{N}C_uC_v\cos\left(\frac{(2j+1)u\pi}{2N}\right)\cos\left(\frac{(2(N-1-k)+1)v\pi}{2N}\right) \quad (12)$$

$$= \frac{2}{N}C_uC_v\cos\left(\frac{(2j+1)u\pi}{2N}\right)\cos\left(\pi+\frac{(-2k-1)v\pi}{2N}\right)$$

$$= (-1)^v C_{jk}^{uv},$$

for j, k=0, 1, 2, ..., (N/2)−1. The kernel matrix has an absolute horizontal symmetry. Thus, the second subkernel matrix can be expressed as $$\underline{C}_2^{uv} = \begin{pmatrix} C_{04}^{uv} & C_{05}^{uv} & C_{06}^{uv} & C_{07}^{uv} \\ C_{14}^{uv} & C_{15}^{uv} & C_{16}^{uv} & C_{17}^{uv} \\ C_{24}^{uv} & C_{25}^{uv} & C_{26}^{uv} & C_{27}^{uv} \\ C_{34}^{uv} & C_{35}^{uv} & C_{36}^{uv} & C_{37}^{uv} \end{pmatrix} = (-1)^v \begin{pmatrix} C_{03}^{uv} & C_{02}^{uv} & C_{01}^{uv} & C_{00}^{uv} \\ C_{13}^{uv} & C_{12}^{uv} & C_{11}^{uv} & C_{10}^{uv} \\ C_{23}^{uv} & C_{22}^{uv} & C_{21}^{uv} & C_{20}^{uv} \\ C_{33}^{uv} & C_{32}^{uv} & C_{31}^{uv} & C_{30}^{uv} \end{pmatrix}. \quad (13)$$

In summary, the second subkernel matrix can be obtained from the first subkernel matrix by reverse of its columns and a sign change controlled by $(-1)^v$. The LSB of v, $v_0$ determines the even or odd number of v. If $v_0=0$, the sign is not changed; if $v_0=1$, the sign should be changed.

By the same reason, we also can prove that the kernel matrix has an absolute vertical symmetry which satisfies $$C_{jk}^{uv} = (-1)^u C_{jk}^{uv}, \ j, k=0, 1, 2, \ldots, (N/2)-1, \quad (14)$$

for $J=N-1-j$. Thus, the third subkernel matrix in terms of the elements in $\underline{C}_1^{uv}$ is given by $$\underline{C}_3^{uv} = (-1)^u \begin{pmatrix} C_{30}^{uv} & C_{31}^{uv} & C_{32}^{uv} & C_{33}^{uv} \\ C_{20}^{uv} & C_{21}^{uv} & C_{22}^{uv} & C_{23}^{uv} \\ C_{10}^{uv} & C_{11}^{uv} & C_{12}^{uv} & C_{13}^{uv} \\ C_{00}^{uv} & C_{01}^{uv} & C_{02}^{uv} & C_{03}^{uv} \end{pmatrix}. \quad (15)$$

The third subkernel matrix can be obtained from the row reverse of the first subkernel matrix and the sign changed controlled by $u_0$, the LSB of u.

When $J=N-1-j$, $K=N-1-k$, the (J, K)th element of the kernel matrix is expressed as $$C_{jK}^{uv} = (-1)^{u+v} C_{jk}^{uv}, \ j,k=0,1,2,\ldots,(N/2)-1. \quad (16)$$

With the center absolute symmetrical property, the fourth subkernel matrix in terms of the elements in $\underline{C}_1^{uv}$ can be expressed by $$\underline{C}_4^{uv} = (-1)^{u+v} \begin{pmatrix} C_{33}^{uv} & C_{32}^{uv} & C_{31}^{uv} & C_{30}^{uv} \\ C_{23}^{uv} & C_{22}^{uv} & C_{21}^{uv} & C_{20}^{uv} \\ C & C_{12}^{uv} & C_{11}^{uv} & C_{10}^{uv} \\ C_{03}^{uv} & C_{02}^{uv} & C_{01}^{uv} & C_{00}^{uv} \end{pmatrix}. \quad (17)$$

The fourth subkernel matrix can be obtained by row-and-column reverse of the first subkernel matrix and the sign changed controlled by the XOR of $u_0$ and $v_0$. Generally speaking, the computation of $F_{uv}\underline{C}^{uv}$ needs only to calculate $F_{uv}\underline{C}_1^{uv}$, which is called as the principal kernel-weighted matrix. The remaining three sub-matrices can be directly obtained by order reverses and the sign changes stated in Eqs.(13), (15), and (17). It is obvious that the multiplications for each DCT coefficient can be reduced to only one fourth of the direct IDCT computations.

How to compute $F_{uv}\underline{C}_1^{uv}$ effectively and efficiently is depicted as follows. By using Eq.(9c), the kernel element $C_{jk}^{uv}$ in the product form can be divided into the addition-subtraction form as $$C_{jk}^{uv} = \frac{1}{N} C_u C_v \left\{ \cos\left(\frac{[(2j+1)u + (2k+1)v]\pi}{2N}\right) + \cos\left(\frac{[(2j+1)u - (2k+1)v]\pi}{2N}\right) \right\} \quad (18)$$

$$= C_{+jk}^{uv} + C_{-jk}^{uv}, \quad \text{for } j, k = 0, 1, \ldots, N-1$$

where $$C_{+jk}^{uv} = \frac{1}{N} C_u C_v \cos\left(\frac{[(2j+1)u + (2k+1)v]\pi}{2N}\right) \quad (19)$$

and $$C_{-jk}^{uv} = \frac{1}{N} C_u C_v \cos\left(\frac{[(2j+1)u - (2k+1)v]\pi}{2N}\right). \quad (20)$$

The calculation of $F_{uv}C_{jk}^{uv}$ using the kernel in Eq.(5) needs two multiplications. If the computation using the kernel stated in Eq.(18), the kernel-weighted DCT coefficient only takes an extra addition to sum up $F_{uv}C_{+jk}^{uv}$ and $F_{uv}C_{-jk}^{uv}$ as $$F_{uv}C_{jk}^{uv} = F_{uv}C_{+jk}^{uv} + F_{uv}C_{-jk}^{uv} \text{ for } j, k=0, 1, \ldots, N/2-1. \quad (21)$$

In order to include the constant values, $C_u$ and $C_v$ defined in Eq.(1), into the computation, we can treat $$C_0 = \cos\left(\frac{\pi N/2}{2N}\right) = \cos\left(\frac{\pi}{4}\right) = \frac{1}{\sqrt{2}} \text{ for } w = 0; \quad (22)$$

as the cosine index of $N/2$. The computation kernel element can be rewritten in a general form as $$C_{jk}^{uv} = \frac{2}{N} C_u C_v \cos\left(\frac{(2j+1)u\pi}{2N}\right) \cos\left(\frac{(2k+1)v\pi}{2N}\right) \quad (23)$$

$$= \frac{2}{N} \cos\left(\frac{\pi M_j^u}{2N}\right) \cos\left(\frac{\pi M_k^v}{2N}\right),$$

where $$M_j^u = \begin{cases} (2j+1)u & \text{for } u \neq 0 \\ N/2 & \text{for } u = 0 \end{cases} \quad (24)$$

and $$M_k^v = \begin{cases} (2k+1) & \text{for } v \neq 0 \\ N/2 & \text{for } v = 0 \end{cases} \quad (25)$$

Thus, the addition-subtraction forms in Eqs.(19) and (20) can be rewritten as $$C_{+jk}^{uv} = \frac{1}{N} \cos\left(\frac{\pi(M_j^u + M_k^v)}{2N}\right) = \frac{1}{N} \cos\left(\frac{\pi M_{+jk}^{uv}}{2N}\right) \quad (26)$$

and $$C_{-jk}^{uv} = \frac{1}{N} \cos\left(\frac{\pi(M_j^u - M_k^v)}{2N}\right) = \frac{1}{N} \cos\left(\frac{\pi M_{-jk}^{uv}}{2N}\right), \quad (27)$$

where the addition cosine index $M_{+jk}^{uv}$ expressed by $$M_{+jk}^{uv} = M_j^u + M_k^v \quad (28)$$

and the subtraction cosine index $M_{-jk}^{uv}$ becomes $$M_{-jk}^{uv} = M_j^u - M_k^v \quad (29)$$

By using the basic properties of cosine function in Eqs. (9a) and (9b), the absolute value of $C_{+jk}^{uv}$ or $C_{-jk}^{uv}$ can be found from one of $$\left\{ 1, \cos\frac{\pi}{2N}, \cos\frac{2\pi}{2N}, \cos\frac{3\pi}{2N}, \ldots, \cos\frac{(N-1)\pi}{2N} \right\},$$

which are located in the first quadrant (i.e., $0 \sim \pi/2$). Besides, it is easy to prove that the addition and the subtraction of any two integer numbers must be same even or odd numbers. Thus, $M_{+jk}^{uv}$ and $M_{-jk}^{uv}$ are both even or odd integers in all cases. The values of $C_{+jk}^{uv}$ and $C_{-jk}^{uv}$ can be obtained from either $$\left\{ \cos\frac{\pi}{2N}, \cos\frac{3\pi}{2N}, \ldots, \cos\frac{(N-1)\pi}{2N} \right\}$$

or $$\left\{ 1, \cos\frac{2\pi}{2N}, \ldots, \cos\frac{(N-2)\pi}{2N} \right\}.$$

Therefore, the computation of $F_{uv}\underline{C}_1^{uv}$ can be obtained from the cosine-weighted DCT coefficients, $$\left\{ F_{uv}\cos\frac{\pi}{2N}, F_{uv}\cos\frac{3\pi}{2N}, \ldots, F_{uv}\cos\frac{(N-1)\pi}{2N} \right\}$$

or $$\left\{ F_{uv}, F_{uv}\cos\frac{2\pi}{2N}, \ldots, F_{uv}\cos\frac{(N-2)\pi}{2N} \right\}$$

which only needs $N/2$ multipliers. From Eqs. (24), (25), (28) and (29), the even-or-odd (E/O) logic can be represented by the XOR of $u_0$ and $v_0$. If E/O is LOW (HIGH), $M_{+jk}^{uv}$ and $M_{-jk}^{uv}$ are even (odd).

From Eqs. (24), (25), (28) and (29), we can generate two addresses to select the proper cosine-weighted DCT coefficients. If the addition and subtraction subkernel address generators initially generate selecting indices (for j=k=0) as $$M_{+00}^{uv}=u+v \text{ and } M_{-00}^{uv}=u-v \text{ if } u\neq 0 \text{ and } v\neq 0; \quad (30a)$$

$$M_{+00}^{uv}=u+N/2 \text{ and } M_{-00}^{uv}=u-v \text{ if } u\neq 0 \text{ and } v=0; \quad (30b)$$

$$M_{+00}^{uv}=N/2-v \text{ and } M_{-00}^{uv}=u-v \text{ if } u=0 \text{ and } v\neq 0; \quad (30c)$$

$$M_{+00}^{uv}=N \text{ and } M_{-00uv}=0 \text{ if } u=0 \text{ and } v=0, \quad (30d)$$

the remaining selection indices can be recursively obtained by $$M_{-(j+1)k}^{uv}=M_{+jk}^{uv} 2 u \text{ and } M_{-(j+1)k}^{uv}=M_{-jk}^{uv}-2 u \quad (31)$$

and $$M_{-(j+1)k}^{uv}=M_{+jk}^{uv} 2 v \text{ and } M_{-(j+1)k}^{uv}=M_{-jk}^{uv}-2 v \quad (32)$$

for j=0, 1, 2, ..., (N/2–2) and k=0, 1, 2, ..., (N/2–2). By using the properties of cosine function, the cosine index increased or decreased by 4 kN (equivalent to 2 k $\pi$) in Eqs. (26) and (27) will not change the results. In Eqs. (31) and (32), the subtraction by 2 v for generating the subtraction cosine index should be performed. In order to normalize the resulting addresses, the cosine indices –v and –2 v can be replaced by 4N-v and 4N-2 v, respectively. By the same reason, we can subtract 4 kN from all indices for referring the same cosine function. If N=$2^m$, the (m+2)th and higher bits, which represent 4 kN in the cosine index as shown in FIG. 6A, can be ignored. Thus, we only need (m+1)-bit length for all the address generators. Since the LSB (i.e., the 0th bit) of the cosine index, which is equivalent to the E/O logic, which has been used in the cosine pre-multiplier array, should be also neglected. The (m+1)th and mth bits of the cosine index denotes the phases of $\pi$ and $\pi/2$, respectively. From the truth table in FIG. 6B, the XOR of the (m+1)th and mth bits determines the sign of the selected cosine function. The selecting addresses exactly use the remaining (m−1) bits of cosine indices for all N/2:1 selectors. Finally, the principal subkernel-weighted matrix $F_{uv}\underline{C}_1^{uv}$ can be calculated by N/2×N/2 adders as shown in Eq. (21).

The accumulating matrix progressively accumulates $F_{uv}\underline{C}_1^{uv}$ by summing-up the 2-D IDCT results of non-zero DCT coefficients as Eq. (8) shown. The accumulators consist of adders perform accumulation of the principal N/2×N/2 subkernel-weighted matrix $F_{uv}\underline{C}_1^{uv}$ by either the addition (or the subtraction) when the input of (±) is logic LOW (or HIGH). For the first accumulating submatrix, the results of $F_{uv}\underline{C}_1^{uv}$ are directly accumulated into the accumulator with (±) of logic LOW, i.e. addition always. In the order of reversed columns, the addition (or subtraction) of the second accumulating submatrix is determined whether if v is even (or odd) as Eq. (13) shown. The least significant bit (LSB) of v concisely represents the logic of (±) for the second accumulator submatrix. From Eqs. (15) and (17), the LSB of u describes the logic of (±) for the third accumulating submatrix and the exclusive-OR (XOR) of the LSBs of u and v depicts the logic of (±) for the fourth accumulating submatrix. However, the third accumulating submatrix accumulates the principal N/2×N/2 subkernel-weighted matrix $F_{uv}\underline{C}_1^{uv}$ in the order of reversed rows. The fourth accumulating submatrix is in the order of reversed columns and reversed rows. The arrangement of reversed order is physically performed by direct hard wire connections in the parallel realization.

The comparison among the proposed 2-D IDCT algorithm and the row-column based method, and the Haque method is shown in Table 1, and the total number of multiplications for completing an 'N×N' 2-D IDCT needed in each algorithm is listed therein.

TABLE 1

| Algorithms | Row-Column Based Method | Haque Method | Proposed 2D IDCT |
|---|---|---|---|
| # of multiplications | $N^2\log_2 N^2 - 3/2 N + 4$ | $3/8 N^2 - \log_2 N^2$ | $1/2(K^* - 1)N$ |

*: K is the number of non-zero DCT coefficients.

The number of multiplications of the proposed algorithm depends on the number of non-zero DCT coefficients. In the worse case, $K=N^2$, the proposed method does not show its advantages for very large N. In general, there are more than two thirds of DCT coefficients are quantized to be zeros for an '8×8' image block. If the motion compensation is employed for sequential images, the number of non-zero quantized DCT coefficients will be dramatically reduced. Besides, the numbers of multipliers and adders required in the proposed processor comparing to the row-column based method are listed in Table 2.

TABLE 2

| Algorithms | U.Totzek et al. method | | Proposed 2-D IDCT | |
|---|---|---|---|---|
| Block size (N) | multipliers | adders | multipliers | adders |
| 8 | 16 | 16 | 4 | 80 |
| 16 | 32 | 32 | 8 | 320 |
| N | 2N | 2N | N/2 | $N^2 + (N/2)^2$ |

The numbers of multipliers and adders for per DCT coefficient needed in each 2-D IDCT processor We found that the reduction factor concerning the number of multipliers of the present invention compared to the row-column approach is 4 in the above table. However, the number of adders of the present invention is larger than Totzek's method required. Besides, the through-put of the IDCT processor should be an important factor in fair comparisons. One cannot compare the through-put performance of a processor under only the base of transformed samples per system cycle (SPC). Here, the comparison is made under the base of the samples per multiplier per cycle (SPMC). Table 3 shows the SPMCs of the row-column based method and the proposed algorithm.

TABLE 3

| Algorithms | U.Totzek et al. Method | | | Proposed 2-D IDCT | | |
|---|---|---|---|---|---|---|
| Size (N) | multipliers | SPC | SPMC | multipliers | SPC | SPMC |
| 8 | 16 | 1 | 0.0625 | 4 | 64/K* | 16/K |
| 16 | 32 | 1 | 0.0313 | 8 | 256/K | 32/K |
| 32 | 64 | 1 | 0.0157 | 16 | 1024/K | 64/K |

*: K is the number of non-zero DCT coefficients.

For N=8, the SPC of the U. Totzek's method is 1 sample per clock in the use of 16 multipliers. Thus, the SPMC of the row-column method is about 0.0625 sample per multiplier per clock. In the same case (N=8), the proposed algorithm requires K system clocks to complete the 64 reconstructed samples. The SPC of the proposed algorithm is 64/K samples per clock in the use of 4 multipliers. Thus, we found that the SPMC of the proposed 2-D DCT algorithm is 16/K samples per multiplier per clock. In the worst case, i.e. K=64, the SPMC of the proposed algorithm is 0.25 which is much greater than that of the row-column based method. When the number of non-zero DCT coefficients is less, the SPMC will become greater. In brief, the proposed algorithm in terms of the SPMC is much more efficient than the row-column based method.

It is noted that the present processor possesses the progressive decoding architecture which is the best candidate so far as the fast forward and backward search modes are concerned. For example, the 2-D IDCT result can only be obtained while the whole procedures are finished for the row-column approach and other direct methods. Any simplification or interruption of the prior processes will cause the reconstructed images severely distorted. However, the proposed 2-D IDCT processor possesses progressive characteristics since each DCT coefficient is independently inverse and sequentially added into the accumulators. Once the inverse processing is started, each DCT coefficient progressively adds its detailed extents to the sum of previous inverse results. Thus, any instantaneous stop or skipping of the processing, the intermediate results contained in the 2-D IDCT processor still can approximately represent the images if the DCT coefficients are transmitted in the zig-zag scanning way, i.e. the low frequency components are to be transmitted first and followed by the higher frequency ones. This progressive behavior, which also can be operated in the fast searching mode, embedded in the present invention will be the advantage for applications of HDTV recording systems.

To sum up, the new 2-D IDCT processor according to the present invention is based upon the coefficient-by-coefficient inverse transformation which retains progressive behavior and parallel architecture suitable for the future digital HDTV systems. The progressive 2-D IDCT behavior of the present invention gives the capacity of the future decoders such that it can be operated under fast forward and backward search modes. Usually, the number of the non-zero DCT coefficients is few, the computation complexity in this case will be less than other algorithms. Besides, the present invention can directly work with its preceding RLC and VLC codes. So, the proposed coefficient-by-coefficient 2-D IDCT algorithm has several remarkable features which can be used in the future HDTV receiving and recoding systems.

While the present invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims whose scope is to be accorded the broadest interpretation so as to encompass all such modifications and equivalent structures.

What is claimed is:

1. A processor for transforming N×N discrete cosine transform (DCT) coefficients $F_{uv}$ inputted from a run-length-code (RLC) decoder into an image data $f_{jk}$ in an integrated circuit through a 2-D inverse discrete cosine transform (IDCT) procedure wherein subscripts u and v of said DCT coefficients $F_{uv}$ are input frequency indices and subscripts j and k of said image data $f_{jk}$ are spatial indices generated by said integrated circuit, which comprises:

a cosine pre-multiplier array for computing cosine-weighted DCT coefficients;

a principal subkernel mapper, including an addition subkernel address generator and a subtraction subkernel address generator, two N/2:1 selector matrices and a sign mutable addition matrix, utilizing said cosine-weighted DCT coefficients by first referring to said indices u and v for parallelly computing a principal N/2×N/2 subkernel-weighted matrix $F_{uv}\underline{C}^{uv}1$;

an N×N accumulating matrix operating with said principal N/2×N/2 subkernel-weighted matrix $F_{uv}\underline{C}^{uv}1$ for progressively accumulating said image data $f_{jk}$; and an output buffer for loading said image data $f_{jk}$ from said N×N accumulating matrix and transferring said image data $f_{jk}$.

2. A processor according to claim 1, wherein said N×N DCT coefficients $F_{uv}$ will be skipped if zero.

3. A processor according to claim 1, wherein a very large scale integration (VLSI) circuit is constructed according to the processor.

4. A processor according to claim 1, wherein said addition subkernel address generator further comprises:

a first set of N/2×N/2 adders for computing cosine indices $M^{uv}_{+jk}$;

a first set of N/2×N/2 index registers utilizing (m+2) bits for storing therein said cosine indices so as to select a corresponding one of said cosine-weighted DCT coefficients and determine a sign change thereof in order to compute said principal N/2×N/2 subkernel-weighted matrix $F_{uv}\underline{C}^{uv}1$; and a first pair of 2:1 selectors having an m-input OR gate and an adder for computing an initial cosine index $M^{uv}_{+00}$ by adding u and v.

5. A process according to claim 4, wherein said subtraction subkernel address generator further comprises:

a second set of N/2×N/2 adders for computing cosine indices $M^{uv}_{-jk}$;

a second set of N/2×N/2 index registers utilizing (m+2) bits for storing therein said cosine indices so as to select one of corresponding said cosine-weighted DCT coefficients and determine a sign change thereof in order to compute said principal N/2×N/2 subkernel-weighted matrix $F_{uv}\underline{C}^{uv}1$; and a second pair of 2:1 selectors having an m-input OR gate and said adder for computing an initial cosine index $M^{uv}_{-00}$ by adding u and 4N-v.

6. A processor according of claim 5, wherein cosine index $M_{+jk}^{uv}$ or $M_{-jk}^{uv}$ is the selection address for which a value of one of the cosine-weighted DCT coefficients is selected.

7. A processor according to claim 5, wherein said m-input OR gate is used to detect whether said indices u and v are zero or not so that said 2:1 selectors will replace said u and v in said addition subkernel address generator by N/2 and replace said u and 4N-v in said subtraction subkernel address generator by N/2 when said indices u and v are zero, respectively.

8. A processor according to claim 5, wherein said (m+2) bits of cosine indices $M^{uv}_{+jk}$ or $M^{uv}_{-jk}$ in said first or second set of N/2×N/2 index registers include 1st to mth bits with a corresponding N/2:1 selector for addressing each of the cosine-weighted DCT coefficients, (m+2)th and (m+1)th bits for determining a sign of the selected cosine-weighted DCT coefficient, and a zeroth bit which is ignored.

9. A processor according to claim 8, wherein said sign chance of said cosine-weighted DCT coefficients by the exclusive OR (XOR) of said (m+1)th and said mth bits of cosine indices $M^{uv}_{+jk}$ or $M^{uv}_{-jk}$ in said first and second sets of N/2×N/2 index registers.

10. A process according to claim 1, wherein said N is a mth power of 2, $2^m$, and m is a positive integer.

11. A processor according to claim 2, wherein a very large scale integration (VLSI) circuit is constructed according to the processor.

12. A processor according to claim 10, wherein according to an even-or-odd (E/O) generated by the exclusive OR (XOR) of $u_0$ and $v_0$ respectively being the least significant bits of u and v, said cosine pre-multiplier array computes said cosine-weighted DCT coefficients.

13. A processor according to claim 12, wherein said accumulating matrix accumulates said principal N/2×N/2 subkernel-weighted matrix $F_{uv}\underline{C}^{uv}1$, computes said image data $f_{jk}$ and outputs said image data $f_{jk}$ to said output buffer, which further includes:

a first N/2×N/2 accumulating submatrix directly adding said principal N/2×N/2 subkernel-weighted matrix $F_{uv}\underline{C}^{uv}1$;

a second N/2×N/2 accumulating submatrix directly adding said principal N/2×N/2 subkernel-weighted matrix $F_{uv}\underline{C}^{uv}1$ in an order of reversed columns when said LSB (least significant bit) $u_0$ is LOW and subtracting said principal N/2×N/2 subkernel-weighted matrix $F_{uv}\underline{C}^{uv}1$ when said LSB $u_0$ is HIGH;

a third N/2×N/2 accumulating submatrix adding said principal N/2×N/2 subkernel-weighted matrix $F_{uv}$ $\underline{C}^{uv}1$ in an order of reversed rows when said LSB $v_0$ is LOW and subtracting same when said LSB $v_0$ is HIGH; and a fourth N/2×N/2 accumulating submatrix adding said principal N/2×N/2 subkernel-weighted matrix $F_{uv}$ $\underline{C}^{uv}1$ in an order of reversed rows and reversed columns when the XOR of said LSBs $u_0$ and $v_0$ is LOW and subtracts same when the XOR of said LSBs $u_0$ and $v_0$ is HIGH.

14. A processor according to claim 12, wherein said cosine pre-multiplier array further includes a fixed-coefficient multiplier and a plurality of dual-fixed-coefficient multipliers.

15. A processor according to claim 14, wherein said cosine pre-multiplier array further includes a 2:1 selector operating with said fixed-coefficient multiplier having a fixed coefficient cos π/2N for obtaining a cosine-weighted DCT coefficient $F_{uv}$ when said E/O is LOW and a cosine-weighted DCT coefficient $F_{uv}\cos \pi/2N$ when said E/O is HIGH.

16. A processor according to claim 14, wherein each multiplier of said cosine pre-multiplier array is a read-only-memory (ROM) which stores therein said cosine-weighted DCT coefficients being in use and corresponding to respectively said DCT coefficients $F_{uv}$ and said E/O as an address accompanied therewith.

17. A processor according to claim 14, wherein said cosine pre-multiplier array further includes an adder operating with each of said plurality of dual-fixed-coefficient multipliers having dual-fixed coefficients $$\alpha = \cos \frac{2(k-1)\pi}{2N} \text{ and } \beta = \cos \frac{(2k-1)\pi}{2N}$$

wherein κ=2, 3, . . . for obtaining a cosine-weighted DCT coefficients $$F_{uv}\cos \frac{2(k-1)\pi}{2N}$$

when cosine-weighted DCT coefficients $$F_{uv}\cos \frac{(2k-1)\pi}{2N}$$

when said E/O is HIGH.

18. A processor according to claim 17, wherein said dual-fixed-coefficient multipliers are realized respectively according to the following three cases:

Case I: if $\alpha q$ and $\beta q$ are both LOW, qth bits of α and β can be neglected;

Case P: if $\alpha j$ and $\beta j$ are both HIGH, jth bits left shifting of said DCT coefficients by using said adder are added together to become said cosine-weighted DCT coefficients; and Case C: if $\alpha i$ and $\beta i$ are different, ith bits left shifting of said DCT coefficients by using said adder are added together to become said cosine-weighted DCT coefficients when a controlling logic $\gamma i=(E/O\cap\alpha i)\cup(E/O\cap\beta i)$ is HIGH, wherein said q, j and i are integers denoting the indices of bit positions of the coefficients.

19. A processor according to claim 17, wherein said adder is functioned in a parallel architecture.

* * * * *